United States Patent Office 3,795,628
Patented Mar. 5, 1974

3,795,628
DAYLIGHT FLUORESCENT PIGMENTS AND
PROCESS FOR PREPARING THEM
Siegfried Noetzel, Mainz, Germany, assignor to Farbwerke Hoechst Aktiengesellschaft vormals Meister Lucius & Bruning, Frankfort am Main, Germany
No Drawing. Filed Nov. 9, 1971, Ser. No. 197,151
Claims priority, application Germany, Nov. 11, 1970,
P 20 55 449.8
Int. Cl. C09k 1/02
U.S. Cl. 252—301.2 R
2 Claims

ABSTRACT OF THE DISCLOSURE

New daylight fluorescent pigments which contain an organic fluorescent dyestuff and as resin a condensation resin consisting of copolymerizates of (meth)-acrylates containing groups capable of being cross-linked and vinyl compounds capable of being copolymerized, which copolymerizates are cross-linked with unplasticized, alcohol-modified urea- or aminotriazine formaldehyde resins and a process for their preparation which comprises incorporating the organic fluorescent dyestuff into the condensation resin. These daylight fluorescent pigments may be employed for preparing fluorescent paints, for example air-drying lacquers on the basis of alkyd resin or physically drying lacquers on the basis of acrylic resins, as well as for preparing fluorescent printing inks such as inks for screen printing, intaglio printing, book printing and offset-litho printing. Due to their high resistance to heat, they are articularly suitable for fluorescent dyeing of plastics and enamels.

---

The present invention relates to new daylight fluorescent pigments which contain an organic fluorescent dyestuff and as resin a condensation resin consisting of copolymerizates of (meth)-acrylates containing groups capable of being cross-linked and vinyl compounds capable of being copolymerized, which copolymerizates are cross-linked with unplasticized, alcohol-modified urea- or aminotriazine formaldehyde resins. The invention also relates a process for preparing the daylight fluorescent pigments comprising incorporating the organic fluorescent dyestuff into the condensation resin.

The definition of (meth)-acrylates containing groups capable of being cross-linked includes compounds of the series of the (meth)-acrylates which contain as reactive groups one or several hydroxyl, carboxyl, methylol or methylol ether groups, such as (meth)-acrylic acid-β-hydroxy-alkyl ester, (meth)-acrylic acid, N-hydroxymethyl-(meth)-acryl amide, N-methoxy-methyl-, N-propoxymethyl- and N-butoxy-methyl-(meth)-acryl amide. As vinyl compounds which may be copolymerized with these (meth)-acrylates containing reactive groups, there may be considered for example (meth)-acrylates without reactive groups, as for example (meth)-acrylic acid alkyl- and aryl-esters or other vinyl compounds such as styrene, methylstyrene, acryl nitrile, vinyl chloride and vinyl acetate.

The copolymerizates of the (meth)-acrylates containing groups capable of being cross-linked and of the vinyl compounds are prepared in accordance with known methods, for example by solution polymerization in solvents such as ketones, esters, aromatic hydrocarbons and alcohols with free-radical initiating catalysts such as dibenzoyl peroxide, dicumyl peroxide or azoisobutyronitrile. The use of mixtures of n-butanol and xylolenes as solvents is preferred. There may be reacted mixtures of different (meth)-acrylates carrying reactive groups as well as mixtures of several vinyl compounds capable of being copolymerized. The amount of the monomer or their mixture containing reactive groups incorporated into the copolymerizate ranges between 10 and 60% by weight, calculated on the sum total of all monomers to be copolymerized.

As resins for cross-linking, urea and aminotriazineformaldehyde condensates are used, as for example the unplasticized, alcohol-modified resins known from U.S. patent specification No. 2,498,592 and British patent specification No. 734,181, which are formed by condensation of urea or aminotriazines with paraformaldehyde in alcohols at 110–120° C. Examples for aminotriazines are above all the 2,4-diamino-1,3,5-triazine,
the 2,4-diamino-6-methyl-1,3,5-triazine,
the 2,4-diamino-6-(3-hydroxybutyl)-1,3,5-triazine,
the 2,4-diamino-6-heptyl-1,3,5-triazine,
the 2,4-diamino-6-phenyl-1,3,5-triazine,
the 2,4-diamino-6-benzyl-1,3,5-triazine,
the 2,4,6-triamino-1,3,5-triazine (melamine),
the 2,4-diamino-6-(β-cyanoethyl)-1,3,5-triazine, and
the 2,4-diamino-6-(ω-cyanovalero)-1,3,5-triazine and their mixtures.

For preparing the condensation resins according to the invention, the solutions of the copolymerizates are mixed at room temperature with the resins for cross-linking dissolved in alcohol, and cured at 130° C.–180° C. if desired in vacuo, the solvents being eliminated. As solvents for copolymerization there are preferably considered lower aliphatic alcohols or their mixtures with xylenes, the ratio being 1:9 to 9:1 parts by volume. The solutions of the copolymerizates and of the resins for cross-linking have concentrations between about 40 and 60 percent by weight. The cross-linking of the reactive (meth)-acrylate copolymers with the resins for cross-linking is effected under the influence of catalysts, such as phosphoric acid or citric acid or under the influence of the (meth)-acrylic acid which may be incorporated into the polymer (internal catalyst).

The amount of the resin for cross-linking added depends on the type of the resin and on the required degree of hardness and brittleness of the final resin formed. The ratio of the copolymerizate to the cross-linking resin may generally vary from 80 to 20 until 20 to 80 parts by weight.

It is possible to add to the mixture of copolymerizate and cross-linking resin epoxide resins, for example reaction products of bisphenol A and epichlorohydrin, which contain at least two epoxide groups. While curing, these epoxide resins react with the reactive groups of the copolymerizate and impart to the resins according to the invention a good hardness and resistance to solvents. The amount of epoxide resin added may range between 5 and 30 percent by weight, calculated on the total amount of copolymerizate and resin for cross-linking.

The condensation resins thus-obtained are characterized by a good transparency and purity and by a sufficient resistance to organic solvents, oxygen and to moisture. They are also more resistant to heat and to light than the resins known from U.S. patent specifications Nos. 2,498,592, 2,809,954, 2,938,873, 3,116,256 and 3,412,036, British patent specifications Nos. 734,181, 748,484, 792,616 and 1,048,983 and from German patent specification No. 961,575. These properties render the resins according to the invention particularly suitable for being used in daylight fluorescent pigments. Daylight fluorescent pigments consist of a colorless finely ground base resin, into which a fluorescent dyestuff has been incorporated. Such daylight pigments are employed more and more in the lacquer, printing ink and plastics industry as well as in the field of textiles and for the coating of paper.

The fluorescent dyestuffs may be incorporated into the base resins by several methods. Thus, they may be dissolved or dispersed either in the mixture of the solutions of copolymerizate and cross-linking resin to be condensed or in the individual resin solutions, and then the resin may be cured. The dyestuffs may also be used in such a form as to be chemically bound to the individual resins.

The cured product thus-obtained is then converted into a finely divided form by dry or wet grinding in a ball or perl mill. Grinding is expediently carried out in the presence of water. The particle size of the daylight pigment, which may vary within wide limits, depends to a large extent on the application field desired. Thus, the average particle size of the daylight fluorescent pigment generally ranges between about 5 and 30μ, if it shall be used for preparing printing inks for silk screen printing or for preparing lacquers, and between about 0.1 and 5μ, if printing inks shall be prepared. As fluorescent dyestuffs there are considered organic compounds which are fluorescent by daylight in dissolved or solid, crystalline form, as for example fluorescent dyestuffs of the rhodamine, sulforhodamine or naphtalimide series. Moreover, the dyestuffs described in French patent specifications Nos. 1,590,506, 1,444,489, 1,488,113 and 1,470,793 may be used.

The concentration of the dyestuff in the resin depends above all on the type of the resin, on the dyestuff used and on the desired application of the daylight pigment. The dyestuff concentration generally ranges between about 0.1 and 10 percent by weight. The daylight pigment preferably contains the dyestuff in a concentration, which provides the best possible brilliancy, the tinctorial strength of the product dyed with this dyestuff being good.

The daylight fluorescent pigments according to the invention may be employed for preparing fluorescent paints, for example air-drying lacquers on the basis of alkyd resin or physically drying lacquers on the basis of acrylic resins, as well as for preparing fluorescent printing inks such as inks for screen printing, intaglio printing, book printing and offset-litho printing. Due to their high resistance to heat, they are particularly suitable for fluorescent dyeing of plastics, which are usually processed between 200° and 300° C., and of enamels which are stoved above 150° C.

The following examples illustrate the invention.

EXAMPLE 1

A mixture of 28 parts of acrylic acid, 178 parts of methyl methacrylate, 127 parts of hydroxy-ethyl-methacrylate, 90 parts of n-butyl-methacrylate, 178 parts of styrene and 7 parts of dibenzoyl peroxide were added during two hours to a boiling mixture of 240 parts by weight of n-butanol and 490 parts by weight of p-xylene. Then the mixture was heated for another two hours to 115° C. After adding 4 parts of dibenzoyl peroxide, the mixture was refluxed for another two hours and after adding 1 part of dibenzoyl peroxide for still another two hours. The content of solids amounts to about 45% and has, thus, reached the theoretical value.

For preparing the solution of resin for cross-linking, 504 parts of melamine and 720 parts of paraformaldehyde were refluxed for 3 hours in 1224 parts of butanol. A clear colorless resin solution was obtained having a content of solids of 45.5%.

If 70, 60 or 40 parts of the above acrylate resin solution are mixed with 30, 40 or 60 parts of the above resin solution for cross-linking and the individual mixtures were cured for 17 hours at 150° C. and 300 mm. of Hg, and the solvent was eliminated, pure, brittle cured products were obtained, which could be ground to a fine powder in a ball mill. The products were decomposed at 300–330° C.

For preparing a daylight fluorescent pigment, 4% of 10-methoxy-benzoxanthene-3,4-dicarboxylic acid hydrazide were added as fluorescent dyestuff, when the resin solution for cross-linking was prepared, and the reaction was continued in the same way as indicated above. Cured products of an intense green-yellow fluorescence were obtained, which decomposed at temperatures between 300 and 330° C. For converting the cured products into a daylight fluorescent pigment, they were finely ground in a ball mill. 4 parts of the daylight fluorescent pigment thus obtained were mixed for one hour in a porcelain ball mill on the roller with 96 parts of n-polystyrene, which was pulverized in a hammer mill. Then the mixture was molded for 5 minutes at 240° C. The pressed plate had an intense green-yellow fluorescence.

Instead of the above-mentioned melamine-formaldehyde-resin solution, there may also be used resin solutions for cross-linking, prepared from 551 parts of benzoguanamine, 360 parts of paraformaldehyde and 910 parts of n-butanol or from 120 parts of acetoguanamine, 120 parts of paraformaldehyde and 250 parts of n-butanol.

If in the above example the copolymerizate resin is replaced by a sulfonamide resin, prepared by melting condensation, at 140°–150° C., of 1710 parts of p-toluene sulfonamide and 600 parts of paraformaldehyde, cured products were obtained which changed their color already at about 200° C. and decomposed at 220°–250° C.

EXAMPLE 2

An acrylate resin solution in n-butanol/p-xylene was prepared in the same manner as in Example 1 from 28 parts of acrylic acid, 178 parts of methyl methacrylate, 127 parts of hydroxyethyl methacrylate, 268 parts of n-butyl methacrylate and 12 parts of dibenzoyl peroxide. The content of solids amounted to about 45%.

If 70, 60 or 40 parts by weight of this acrylate resin solution were mixed with 30, 40 or 60 parts by weight of the melamine-formaldehyde-resin solution described in Example 1 and if the mixtures were cured during 17 hours at 150° C. in vacuo (300 mm. of Hg), transparent solid products were obtained which could be finely ground in the ball mill. They decomposed at 310–340° C.

For preparing a daylight fluorescent pigment, the above-described acrylate-resin solution was mixed with the melamineformaldehyde-resin solution according to Example 1, which contained 2% of benzothioxanthene-3,4-dicarboxylic acid hydrazide, the ratios being 70:30, 60:40 and 40:60 and cured at 150° C. in vacuo (300 mm. Hg) during 17 hours. After grinding in known manner, the cured products resulted in daylight fluoroescent pigments of an intense green yellow fluorescence, which decomposed at 310°–340° C.

Instead of the 10-methoxy-benzoxanthene-3,4-dicarboxylic acid hydrazide, the following fluorescent dyestuffs may be used (the fluorescent shades are indicated): benzoxanthene-3,4-dicarboxylic acid amide (green), benzoxanthene - 3,4 - dicarboxylic acid-N-3'-sulfonamido-phenyl imide (green), benzothioxanthene - 3,4-dicarboxylic acid stearylic imide (greenish yellow), benzothioxanthene-3,4-dicarboxylic acid hydrazide (greenish yellow), 4-amino-1,8-naphtal-2',4'-dimethyl phenyl imide (green) or 7-oxo-14-thia-dibenzo(b,d,e,f)-chrysene (orange yellow).

4 parts of the daylight fluorescent pigment obtained according to the above example, were mixed for 5 minutes at 100° C. with 90 parts of a pulverized polyvinyl chloride, which contained 3% of an organic tin stabilizer and 1% of oxystearine acid on a double roller mixer. The resulting coat was stripped off and compression molded for 5 minutes at 170° C. The pressed sheet had an intense green-yellow fluorescence.

EXAMPLE 3

According to the process of Example 1, an acrylate resin solution in n-butanol/p-xylene was prepared from 28 parts of acrylic acid, 178 parts of methyl methacrylate, 127 parts of hydroxyethyl methacrylate, 90 parts of n-butyl methacrylate, 178 parts of α-methylstyrene and 12 parts of dibenzoyl peroxide having a content of solids of about 45%.

If 70, 60 or 40 parts by weight of this acrylate resin solution were mixed with 30, 40 or 60 parts by weight of the melamine-formaldehyde resin solution according to Example 1 and the mixtures cured at 150° C. in vacuo (300 mm. of Hg) for 17 hours, transparent brittle solid products were obtained, which decomposed at 300°–320° C.

For preparing a daylight fluorescent pigment, a melamineformaldehyde resin solution was used in the above example, which contained 2.2% of rhodamine B in a dissolved form.

The cured products obtained weer finely ground in a ball mill. Thus, a red fluorescent daylight pigment was obtained which decomposed at 300–320° C.

For preparing an enamel, 20 parts of the daylight fluorescent pigment obtained according to the above example were ground for 20 minutes on the paint-shaker together with 45 parts of xylene, 25 parts of a 60% solution of a short-oil, non-drying alkyl resin from 37% of oil (triglyceride) and 40% of phthalic acid anhydride in xylene and with 10 parts of a 50% solution of a non-plasticized melamine resin in alcohols and aromatic hydrocarbons in the presence of quartzite perls (2–3 mm. $\phi$) in a 200 ml. plastic beaker. The lacquer obtained was sprayed on white-coated test plates (30 x 30 cm.) and stoved for 20 minutes at 160° C. The resulting lacquer had an intense red fluorescence.

EXAMPLE 4

According to the process of Example 1, an acrylate resin solution in 240 parts of n-butanol and 490 parts of p-xylene was prepared by mixed polymerization of 28 parts of acrylic acid, 178 parts of methyl-methacrylate, 127 parts of hydroxyethyl methacrylate, 268 parts of n-butyl methacrylate and 30 parts of methacrylamide with 12 parts of dibenzoyl peroxide and then reacted for 30 minutes at 100° C. with 9.8 parts of paraformadelhyde.

70, 60 or 40 parts by weight of this acrylate resin solution were mixed with 30, 40 or 60 parts by weight of the melamineformaldehyde resin solution of Example 1 and cured at 150° C. in vacuo (300 mm. Hg) for 17 hours. The resulting cured products decomposed at 300–320° C.

If in the above example a melamine-formaldehyde-resin solution was usd which contained 4% of 10-methoxy-benzoxanthene-3,4 - dicarboxylic acid hydrazide in dissolved form, cured products were obtained which yielded, after being ground in a ball mill, yellow-green fluorescent daylight pigments.

I claim:

1. A daylight fluorescent pigment composition comprising an organic fluorescent dyestuff and a cross-linked condensation resin of (a) 20% to 80% by weight of a copolymerizate having groups capable of being cross-linked that is a copolymerization product of about 10% to about 60% by weight of methacrylic acid, hydroxy lower alkyl methacrylate, N-hydroxy lower alkyl methacrylamide, N-lower alkoxy lower alkyl methacrylamide, acrylic acid, hydroxy lower alkyl acrylate, N-hydroxy lower alkyl acrylamide or N-lower alkoxy lower alkyl acrylamide, and of about 90% to about 40% by weight of methacrylic acid alkyl ester, methacrylic acid aryl ester, styrene, methyl styrene, acrylonitrile, vinyl chloride or vinyl acetate, and (b) 80% to 20% by weight of an unplasticized alcohol-modified condensate of urea or 2,4-diamino-, 2,4-diamino-6-methyl-, 2,4-diamino-6-(3-hydroxy-butyl)-, 2,4-diamino-6-heptyl-, 2,4-diamino-6-phenyl-, 2,4-diamino-6-benzyl-, 2,4,6-triamino-, 2,4-diamino-6-($\beta$-cyanoethyl)- or 2,4-diamino-6-(omega-cyanovalero)-1,3,5-triazine with paraformaldehyde.

2. A daylight fluorescent pigment according to claim 1 wherein the cross-linked condensation resin contains additionally 5% to 30% of the reaction product of Bisphenol A and epichlorhydrin which contains at least two epoxide groups.

References Cited

UNITED STATES PATENTS

| 2,938,873 | 5/1960 | Kazenas | 252—301.3 R |
| 3,222,418 | 12/1965 | Murdock | 260—856 |
| 3,382,294 | 5/1968 | Christenson et al. | 260—856 |
| 3,412,036 | 11/1968 | McIntosh | 260—856 |
| 3,532,768 | 10/1970 | Dalibor et al. | 260—850 |
| 3,532,769 | 10/1970 | Dalibor et al. | 260—850 |
| 3,532,770 | 10/1970 | Dalibor et al. | 260—850 |

DANIEL E. WYMAN, Primary Examiner

A. P. DEMERS, Assistant Examiner

U.S. Cl. X.R.

106—288 Q; 252—301.3 R; 260—39, 41, 850, 851, 856